USO09783019B2

(12) United States Patent
Diekmeyer

(10) Patent No.: US 9,783,019 B2
(45) Date of Patent: Oct. 10, 2017

(54) COMPRESSED AIR SUPPLY SYSTEM FOR A COMPRESSED AIR CONSUMER CIRCUIT

(75) Inventor: Heinrich Diekmeyer, Barsinghausen (DE)

(73) Assignee: WABCO GmbH, Hannover (DE)

( * ) Notice: Subject to any disclaimer, the term of this patent is extended or adjusted under 35 U.S.C. 154(b) by 1163 days.

(21) Appl. No.: 13/375,355

(22) PCT Filed: May 5, 2010

(86) PCT No.: PCT/EP2010/002750
§ 371 (c)(1),
(2), (4) Date: Nov. 30, 2011

(87) PCT Pub. No.: WO2010/149244
PCT Pub. Date: Dec. 29, 2010

(65) Prior Publication Data
US 2012/0073669 A1    Mar. 29, 2012

(30) Foreign Application Priority Data

Jun. 23, 2009  (DE) .................. 10 2009 029 898

(51) Int. Cl.
*B60G 17/052*    (2006.01)
*F15B 13/02*    (2006.01)
*F15B 11/16*    (2006.01)

(52) U.S. Cl.
CPC ........ *B60G 17/0523* (2013.01); *F15B 11/162* (2013.01); *B60G 2400/51* (2013.01);
(Continued)

(58) Field of Classification Search
USPC .......... 137/351, 899, 512.2, 118.01, 118.06; 280/124.1, 124.157, 124.16, 124.161;
(Continued)

(56) References Cited

U.S. PATENT DOCUMENTS 3,479,999 A * 11/1969 Keller .................... F02M 59/00
137/512.2
3,707,981 A *  1/1973 Sadler ................. F16K 17/0473
137/115.16
(Continued)

FOREIGN PATENT DOCUMENTS

DE         2950904 A1    6/1981
DE       33 20 047 C2   12/1984
(Continued)

OTHER PUBLICATIONS

Installation Guide for G749 "Overflow Valve with Backflow," Graubremse GmbH Heidelberg, Germany, published Jun. 1972, pp. 1-2.

*Primary Examiner* — Kevin Murphy
*Assistant Examiner* — Jonathan Waddy
(74) *Attorney, Agent, or Firm* — Warner Norcross & Judd LLP

(57) ABSTRACT

In a compressed air supply system for a first compressed air consumer circuit such as an air spring system of a vehicle, a first compressed air line leads to the first compressed air consumer circuit and a distribution line leads to further consumer circuits. A priority valve arrangement is disposed between the first compressed air line, wherein the first compressed air line comprises no safety valve. The first compressed air consumer circuit can therefore be filled at a higher priority, and achieve operational readiness quickly in air spring processes such as lifting or raising activities.

14 Claims, 3 Drawing Sheets

(52) U.S. Cl.
CPC .... *B60G 2500/2012* (2013.01); *F15B 13/022* (2013.01); *F15B 2211/20576* (2013.01); *F15B 2211/212* (2013.01); *F15B 2211/30505* (2013.01); *F15B 2211/30525* (2013.01); *F15B 2211/329* (2013.01); *F15B 2211/50518* (2013.01); *F15B 2211/555* (2013.01); *F15B 2211/611* (2013.01); *F15B 2211/625* (2013.01); *F15B 2211/6313* (2013.01); *F15B 2211/7142* (2013.01); *F15B 2211/781* (2013.01); *Y10T 137/0318* (2015.04); *Y10T 137/2663* (2015.04); *Y10T 137/8593* (2015.04)

(58) Field of Classification Search
USPC .... 267/64.11, 64.27, 64.28; 188/151 R, 152, 188/352, 355
See application file for complete search history.

(56) References Cited

U.S. PATENT DOCUMENTS

| | | | | |
|---|---|---|---|---|
| 3,744,751 | A * | 7/1973 | Robinson | F16K 17/042 137/329.06 |
| 4,014,360 | A * | 3/1977 | Adams | F15B 11/162 137/118.06 |
| 4,057,073 | A * | 11/1977 | Adams | F15B 11/162 137/118.06 |
| 4,625,751 | A * | 12/1986 | Gage | B62D 5/07 137/118.06 |
| 4,664,141 | A * | 5/1987 | Starr | B60G 17/0408 137/493.2 |
| 5,678,900 | A * | 10/1997 | Blanz | B60G 17/0523 137/115.19 |
| 5,975,541 | A | 11/1999 | Harara et al. | |
| 6,089,831 | A | 7/2000 | Bruehmann et al. | |
| 6,116,586 | A * | 9/2000 | Westerkamp et al. | 267/64.28 |
| 6,276,761 | B1 * | 8/2001 | Beck | B60T 11/326 303/127 |
| 6,332,623 | B1 * | 12/2001 | Behmenburg et al. | 280/124.16 |
| 6,685,174 | B2 * | 2/2004 | Behmenburg et al. | 267/64.28 |
| 6,726,189 | B2 | 4/2004 | Folchert et al. | |
| 6,868,866 | B2 | 3/2005 | Hear | |
| 6,948,580 | B2 * | 9/2005 | Scholten et al. | 180/89.14 |
| 7,097,166 | B2 | 8/2006 | Folchert | |
| 7,331,592 | B2 | 2/2008 | Heer | |
| 7,942,427 | B2 * | 5/2011 | Lloyd | 280/6.157 |
| 9,283,942 | B2 * | 3/2016 | Minato | B60T 13/662 |
| 2002/0079626 | A1 | 6/2002 | Grotendorst et al. | |
| 2002/0136645 | A1 | 9/2002 | Folchert et al. | |
| 2003/0047853 | A1 | 3/2003 | Behmenburg | |
| 2003/0209267 | A1 * | 11/2003 | Heer | B01D 53/0454 137/118.06 |
| 2003/0209268 | A1 * | 11/2003 | Heer | B01D 53/0446 137/118.06 |
| 2003/0209276 | A1 | 11/2003 | Hear | |
| 2004/0141853 | A1 | 7/2004 | Duchet et al. | |
| 2004/0145100 | A1 * | 7/2004 | Delorenzis | 267/64.28 |
| 2004/0262986 | A1 | 12/2004 | Folchert | |
| 2005/0017474 | A1 | 1/2005 | Heer | |
| 2007/0096554 | A1 * | 5/2007 | Detlefs et al. | 303/127 |
| 2007/0246999 | A1 | 10/2007 | Hilberer | |
| 2009/0140474 | A1 * | 6/2009 | Lloyd | 267/64.11 |
| 2009/0285696 | A1 | 11/2009 | Fries et al. | |
| 2010/0186827 | A1 | 7/2010 | Ertl | |

FOREIGN PATENT DOCUMENTS

| | | | |
|---|---|---|---|
| DE | 4109741 | C1 | 3/1992 |
| DE | 100 04 091 | A1 | 8/2001 |
| DE | 10004091 | A1 | 8/2001 |
| DE | 103 22 578 | B3 | 9/2004 |
| DE | 10323037 | A1 | 12/2004 |
| DE | 10 2004 038705 | B3 | 4/2006 |
| DE | 102004038705 | B3 * | 4/2006 ......... B60G 17/0408 |
| DE | 60206176 | T2 | 6/2006 |
| DE | 696 36 537 | T2 | 10/2006 |
| DE | 60 2005 000 153 | T2 | 11/2006 |
| DE | 102005026344 | A1 | 12/2006 |
| DE | 102006034761 | B3 | 10/2007 |
| DE | 102006034762 | B3 | 10/2007 |
| DE | 102006034785 | A1 | 1/2008 |
| EP | 0 071 278 | B1 | 2/1983 |
| EP | 1 243 447 | A2 | 9/2002 |
| EP | 1 361 132 | A1 | 11/2003 |
| EP | 1 502 778 | A1 | 2/2005 |
| EP | 1508488 | A1 | 2/2005 |

* cited by examiner

COMPRESSED AIR SUPPLY SYSTEM FOR A COMPRESSED AIR CONSUMER CIRCUIT

FIELD OF THE INVENTION

The present invention relates generally to compressed air systems, such as a compressed air conditioning system/unit and a vehicle air suspension system, compressed air distribution and circuit protection, and in particular, to a system and method for supplying air to such compressed air systems.

BACKGROUND OF THE INVENTION

DE 100 04091 C2 discloses a vehicle compressed air supply device having a compressor and a multi-circuit protection valve whose circuits, which are provided with compressed air containers, are supplied with compressed air via a supply line. In the known device, no rapid air suspension raising processes are possible.

SUMMARY OF THE INVENTION

Generally speaking, it is an object of the present invention to provide a compressed air supply system for controlling the supply of air to, for example, an air suspension system such that improved function or control behavior is made available.

According to one aspect of the invention, it is possible to attain a functional capability of the consumer system, such as, for example, of the air suspension system, when, for example, the empty compressed air system of the vehicle is filled or during suspension raising processes. The vehicle is therefore available more quickly.

Exemplary embodiments of the invention permit rapid filling of the one of more air spring bellows. In addition, exemplary embodiments of the invention are distinguished by low expenditure and low costs.

The bellow or bellows of the air suspension system can be quickly placed at high pressures during the raising process without having to also fill containers in a time-consuming fashion.

Exemplary embodiments further provide the advantage of the possibility of prioritized conveying of the compressor into the air spring bellows without containers also having to be filled. This can also be done at high bellow pressures without having to dispense with the exchange of air between the circuits in the normal operating mode. In addition, it is possible to effectively utilize the compressed air in the containers for rapid filling of the air spring bellow or bellows.

Exemplary embodiments of the invention also permit air spring lifting processes (for example, when changing truck platforms) to be executed very rapidly.

Exemplary embodiments of the invention can generally be used in compressed air distribution and circuit protection and/or in a compressed air conditioning system/unit.

Still other objects and advantages of the present invention will in part be obvious and will in part be apparent from the specification.

The present invention accordingly comprises the several steps and the relation of one or more of such steps with respect to each of the others, and embodies features of construction, combinations of elements, and arrangement of parts adapted to effect such steps, all as exemplified in the detailed disclosure hereinafter set forth, and the scope of the invention will be indicated in the claims.

BRIEF DESCRIPTION OF THE DRAWINGS

Exemplary embodiments of the invention will be described in more detail below with reference to the appended drawings, in which.

DETAILED DESCRIPTION OF THE PREFERRED EMBODIMENTS

Figure 1:
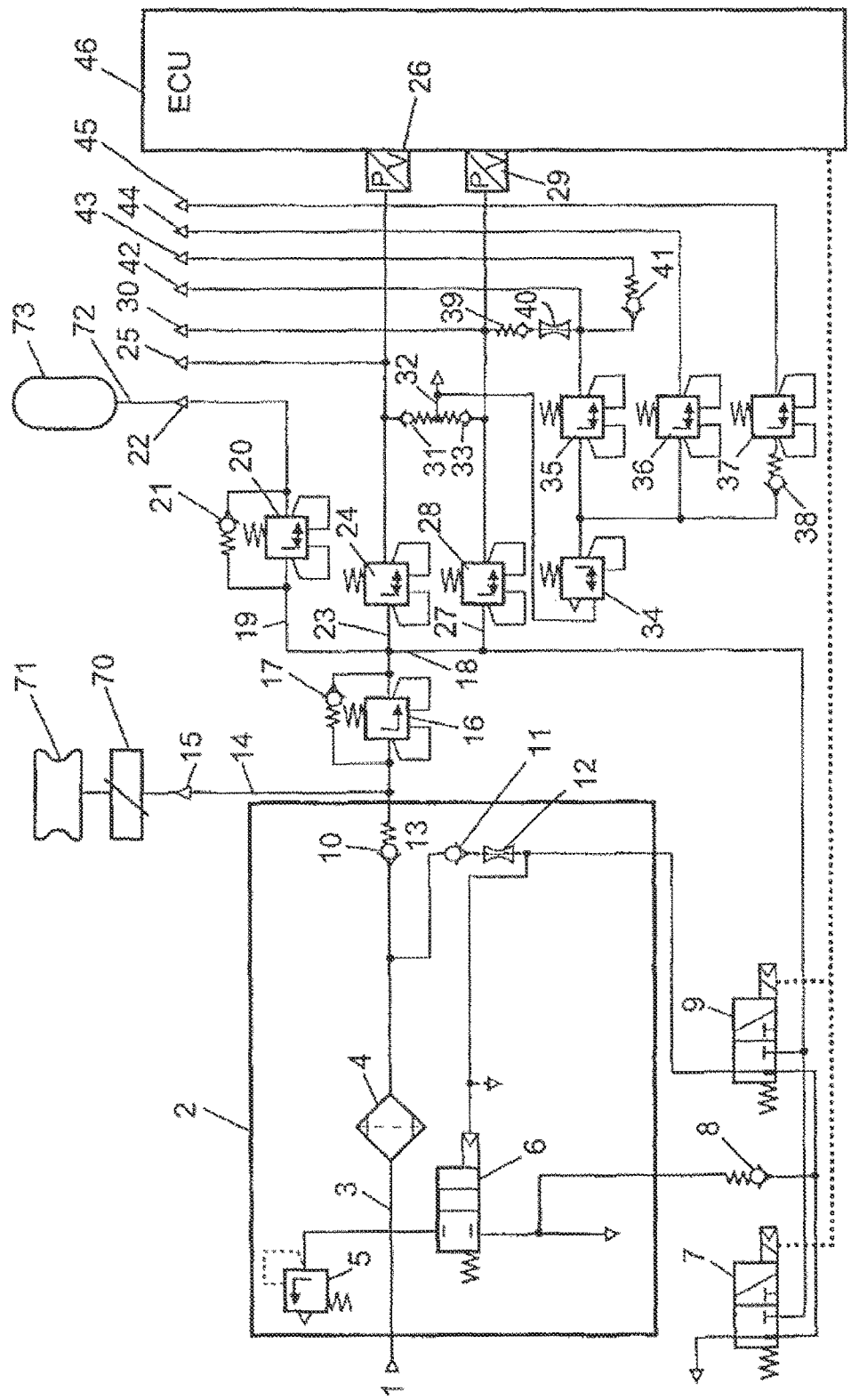
FIG. 1 shows a compressed air supply system including a valve arrangement according to an embodiment of the invention.

FIG. 1 shows an exemplary embodiment of a compressed air supply system connected to an air suspension system, the compressed air supply system having a valve arrangement according to an inventive embodiment. The supply system is part of a compressed air conditioning system, which contains a compressor (not shown) connected to an inlet 1 of an air dryer component 2. A compressed air supply line 3 leads from the inlet 1 to a nonreturn valve 10 via an air dryer 4 that is provided with a filter.

An overpressure valve 5 and a pressure-controllable valve 6 are connected to the compressed air supply line 3. An outlet connection and the outlet of a nonreturn valve 8, whose inlet is connected to valves 7, 9, are connected to the valve outlet of the valve 6. A nonreturn valve 11 is inserted into the compressed air supply line 3 between the air dryer 4 and the nonreturn valve 10, and is connected to the valve 9 via a throttle 12. When the compressor feeds, pressure builds up in the compressed air supply line 3 and the nonreturn valve 10 opens, while the nonreturn valve 11 closes.

The nonreturn valve 10 is connected on the outlet side to a junction 13, which is connected via a fluid pressure line 14 to a connection 15 to which one or more electronically controllable valves, ECAS valves, 70 of the air suspension system, or alternatively or additionally of another consumer circuit, are connected. The valves 70 control the filling and emptying of a schematically shown bellows 71 of the air suspension system and/or of a compressed-air-operated lift system or of some other consumer circuit. Just one bellows 71 is shown, but there may also be a plurality thereof.

The junction 13 is also connected to a priority valve 16, which can be embodied as an electrically controllable valve, for example as a solenoid valve. The priority valve is controlled by control electronics, for example as a function of time or as a function of the pressure in the pressure line 14, for the prioritized supply of the priority-controlled consumer circuit such as the air suspension system or the lifting spring air bellows 71 thereof.

Figure 2:
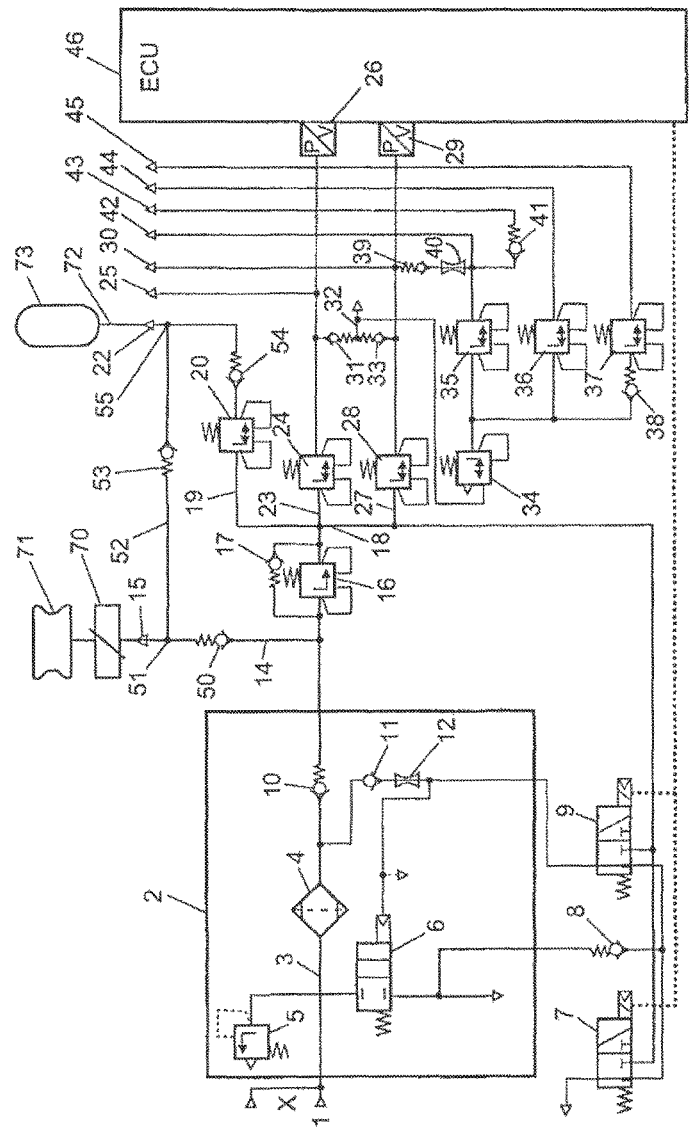
FIG. 2 shows a compressed air supply system with a modified valve arrangement according to an embodiment of the invention.

In the exemplary embodiments of priority circuits shown in FIGS. 1 and 2, the priority valve 16 is embodied as an overflow valve with an optional feedback device 17. In this way, there is no need for an electrical controller and the design of the air conditioning system can be kept extremely simple with a high level of functional reliability.

The priority valve 16 is connected on the output side to a distributor line 18, from which pressure lines 19, 23, 27 leading to protection valves 20, 24, 28 branch off. The pressure line 19 is connected via a protection valve 20 to a connection 22 to which the pressure accumulator container or containers 73 of the air suspension system is/are optionally connected.

In this exemplary embodiment, the protection valve 20 is embodied as an overflow valve that is provided with an optional feedback device 21. Alternatively, the protection valve 20 can also be embodied as an electrically controllable valve, for example as a solenoid valve.

Further consumer circuits, for example, for the service brake or parking brake, driver's cab suspension, door controller etc., are connected to the distributor line 18. As an example, a consumer circuit 23, which leads to a consumer connection 25, has a protection valve 24 and a pressure sensor 26. Likewise, a consumer circuit 27, which is connected to a consumer connection 30, has a protection valve 28 and a pressure sensor 29. The service brake circuits are connected to the consumer connections 25 and 30. The service brake circuits each contain one or more containers (not illustrated). The consumer circuit 23 is connected to the consumer connections 25 and 30 by means of the nonreturn valves 31, 33. A pressure-limiting valve 34, for supplying the other circuits with protection valves 35, 36, 37 and nonreturn valves 38 and 41, is coupled to the connected outlets 32 of the nonreturn valves 31, 33. The supply line 27 is coupled via a nonreturn valve 39 and a throttle 40 to the circuit containing the protection valve 35. The trailer is connected to the consumer connection 42, the parking brake circuit is connected to the consumer connection 43, and secondary consumer circuits are connected to consumer connections 44, 45, which are connected to the operating components to be supplied.

An electronic control unit 46 generates electrical control signals for controlling electrically controllable valves that control the compressed air flow and distribution, on the basis of the sensed pressure sensor values and further operating parameters such as ignition position, coupling activation, lift activation, etc.

The control unit 46 or alternatively also another electronic circuit, preferably that of the electronic air conditioning unit, E-APU, transmits enable signals to the air suspension electronics (not illustrated) that control the valves 70, and the control unit 46 is therefore able to control the extraction of air from the air suspension. With the enable signal (for example, communicated via the vehicle CAN-Bus), the control unit 46 of the electronics permits the air suspension to consume compressed air. This signal can, for example, be dependent on the pressures that are present in the service brake, measured with the pressure sensors 26 and 29.

As is apparent from FIG. 1, the inlet of the protection valve 20 is not connected directly to the outlet of the air dryer 4 and of the nonreturn valve 10. Instead, a branch proceeds directly (that is to say without a protection valve in the line 14) from the junction 13 located between the outlet of the air dryer 4 and the protection valve 20 to the at least one air suspension valve, ECAS valve 70, which is connected to the connection 15. The priority valve 16, which is embodied as an overflow valve and whose outlet is connected to the inlet of the protection valve 20, is arranged in the second branch of the junction 13.

The priority valve 16 optionally has an opening pressure that is relatively high to very high compared to the opening pressures of the protection valves 20, 24, 28 and to the switch off pressure of the pressure regulator (not shown). The compressor, which is connected at the inlet 1, is therefore able to raise the one or more air spring bellows 71, connected to the connection 15, to a very high pressure very quickly. This is advantageous, for example, when filling the empty compressed air system of the vehicle. The compressor firstly fills the junction 13 with compressed air. If the valve or valves 70 is/are opened, the bellows 71 of the air spring system is/are also filled. The priority valve 16 closes the path to the distributor line 18. When the desired bellows pressure is reached, the valves 70 are closed. As a result, the bellows 71 is/are filled very quickly since the compressor fills only the bellows 71 but not the other consumer circuits 25, 30, 42, 43, 44, 45, and not the pressure accumulator container or containers 73 of the air suspension system. A further effect is that the vehicle suspension is operationally capable as a first system. After the valves 70 have closed, the pressure in the junction 13 continues to rise until the priority valve 16 opens and the distributor line and also the other consumer circuits are filled.

It is also conceivable that the valve or valves 70 firstly remain closed, controlled by means of the enable signal, when the empty compressed air system of the vehicle is filled. In that case, the pressure in the junction 13 rises immediately and opens the priority valve 16 when the opening pressure thereof is reached. The distributor line 18 is then filled. The overflow valves 24 and 28, for example, then open with the result that the containers of the service brake circuits are filled first. If the pressure in the service brake circuits is high enough, measured with the pressure sensors 26 and 29, to ensure a certain service braking effect, the electronic control unit 46 transmits the enable signal and therefore permits the electronics of the air suspension system to open the valves 70 in order to fill the bellows 71. In the context, the pressure in the junction 13 collapses, with the result that the priority valve 16 closes. The compressor now feeds again only into the bellows 71 and fills them quickly. In this way, priority of the service braking capability over the vehicle suspension capability is achieved. After the bellows 71 have been filled and the valves 70 have closed, the pressure in the junction 13 continues to rise until the priority valve 16 opens and the other consumer circuits 25, 30, 42, 43, 44, 45 and also the pressure accumulator container or containers 73 of the air suspension system are filled further. When all bellows and consumer circuits are filled, the compressor is switched off.

When the compressed air system of the vehicle is filled, the optional feedback device 17 of the priority valve 16 permits rapid filling of the bellows 71 that is/are connected to the connection 15, from the container or containers that is/are connected to the protection valve 20 and the connection 22, and also from the containers (not illustrated) that are connected to the protection valves 24 and 28 and the consumer connections 25 and 30 (service brake circuits), until the nonreturn valve of the feedback device 17 closes (pressure equalization). If the pressure during the pressure equalization is very low, it may be the case that the protection valves 24 and 28 (service brake circuits) close beforehand, with the result that a certain braking effect continues to be ensured. After the closing of the nonreturn valve 17, only the compressor continues to fill the one or more bellows 71 directly via the line 14. This takes place without further containers being also filled at the same time since the priority valve 16 and the nonreturn valve 17 are closed. As a result, rapid filling of the bellows 71 is ensured. After the bellows 71 have been filled and the valves 70 have closed, the pressure in the junction 13 continues to rise until the priority valve 16 opens and the other consumer circuits are filled further. When all the bellows and consumer circuits are filled, the compressor is switched off. It is apparent that, for the other consumer circuits 25, 30, 42, 43, 44, 45 and also the pressure accumulator container or containers 73 of the air suspension system to close, the opening pressure of the priority valve 16 must be higher than the maximum working pressure in the line 14 and the maximum bellows pressure.

The priority valve (overflow valve) 16 optionally has no hysteresis or only a small hysteresis or even a negative hysteresis. Hysteresis here means the difference between the opening pressure and the closing pressure. The closing pressure is frequently lower (for example 15%) than the opening pressure. This means that if pressure is already present in the overflow valve, the valve already opens before the actual opening pressure is reached. This pressure in the distributor line 18 or in the line 19 has in fact an effective area in the valve. The overflow valve opens at the actual opening pressure only when the distributor line 18 or the line 19 is pressureless. In order to keep this dependence on the pressure on the outlet side of the priority valve as small as possible, the hysteresis should be very small or zero or even slightly negative. A negative hysteresis means that the closing pressure is higher than the opening pressure. This prevents the priority valve 16 from opening early and the containers that are connected to the protection valve 20 or the other protection valves from being also filled in a time-consuming fashion.

As is apparent from FIG. 1, the protection valve 20 is optionally also embodied as a (second) overflow valve with a feedback device 21 that is connected at the connection 22 to the containers assigned to the air suspension.

This overflow valve 20 permits the priority during the filling of the containers assigned to the air suspension, if these containers are present.

If the opening pressure of the overflow valve 20 is higher than the opening pressure of the other overflow valve or valves (for example, valve 24) that are provided for the service brake, the brake containers are filled before the air spring containers. If such a priority is not necessary, this valve 20 can also be omitted. If the valve 20 is present, a small hysteresis, no hysteresis or a negative hysteresis of the valve 20 can prevent the valve 20 from opening early and the air spring containers from being filled at the same time as the brake containers. As result, the full braking force is reached relatively quickly. Otherwise, without the valve 20 or without a small hysteresis, no hysteresis or a negative hysteresis, the full braking force would only be available later.

The optional feedback device 21 (shown in FIG. 1) of the protection valve 20 permits, together with the optional feedback device 17 of the priority valve 16, the first rapid filling of the bellows 71 that is/are connected to the connection 15, from the container or containers that is/are connected to the protection valve 20 and the connection 22 (pressure equalization), specifically until the nonreturn valve of the feedback device 21 or 17 closes.

FIG. 2 shows a further exemplary embodiment of a consumer circuit according to the invention in the form of an air suspension system.

The exemplary embodiment according to FIG. 2 differs from the exemplary embodiment according to FIG. 1, in that, inter alia, a valve 50, for example a nonreturn valve, is inserted into the line 14 between the junction 13 and the connection 15 that is connected to the air suspension valves 70, the valve 50 permitting a flow only in the direction from the junction 13 to the connection 15, but closing in the opposite direction. Furthermore, a connecting line 52 is present, which fluidically connects the connections 15 and 22 to one another and, which is connected to the line 14 at a junction 51 located between the valve 50 and the connection 15. Furthermore, the connecting line 52 is connected to the line leading to the connection 22, at a junction 55 located between the valve 20 and the connection 22. In the connecting line 52, there is a valve 53, for example in the form of a nonreturn valve, that permits a flow of fluid only from the connection 22 to the connection 15.

The protection valve 20 is embodied without a feedback device in the exemplary embodiment according to FIG. 2. A valve 54, for example a nonreturn valve, is inserted between the outlet of the protection valve 20 and the connection 55, the valve 54 permitting a flow only in the direction from the protection valve 20 to the connection 55 and 22, but closing in the opposite direction.

Furthermore, the exemplary embodiments in FIGS. 1 and 2 largely correspond, and with respect to the further components shown in FIG. 2, reference is therefore made to the above explanations of the corresponding reference signs in FIG. 1.

The exemplary embodiment according to FIG. 2 permits even faster initial filling of the one or more air spring bellows at the connection 15 from the container at the connection 22, since owing to the just one valve 53 in the direct flow path between the connections 15, 22, only a small flow resistance is present between these connections.

The exemplary embodiment according to FIG. 2 has the advantage that, at the start of the raising process, the air spring containers 73 are at the maximum pressure and therefore, the maximum quantity of compressed air is available in the containers for this raising operation. In the exemplary embodiment according to FIG. 2, by virtue of the nonreturn valve 54, the containers of the air suspension maintain the maximum pressure that has built up in the normal operation in the distributor line 18. Otherwise (for example, in the exemplary embodiment according to FIG. 1), only the current pressure of the distributor line 18 would be available to the air spring containers 73. The current pressure fluctuates during normal operation and varies between the switch on pressure and the switch off pressure of the compressor. A further advantage of FIG. 2 is that the quantity of compressed air in the air spring containers 73 is available only to the air suspension.

The circuitry in the exemplary embodiments of the invention is very flexible owing to the communication with the electronically controlled air suspension system (ECAS), and also very cost-effective. For example, there is no need for a solenoid valve for the priority valve 16, which reduces the technical complexity and increases the reliability even further.

In addition to the advantages during the raising operations, there is, for example, also the possibility of the smart control of the filling sequence of the consumer circuits, for example for a rapid vehicle start. For this purpose, the solenoid valves that are connected to the individual consumer circuits can be correspondingly opened and closed.

For a rapid vehicle start, it is possible, for example, firstly to fill the brake containers until the warning lamp goes out and the spring-type actuators can be released. The vehicle can now drive away as necessary. It is then possible, as described above, for the air spring bellows to be subsequently filled to the normal level. The vehicle now has the entire suspension. Afterwards, the brake containers can be filled up to the opening pressure of the overflow valve 20, after which the air spring containers can be filled, and then all the containers can be filled to the switch off pressure. The opening pressure of the overflow valve 20 must be higher for this than the opening pressure of the overflow valves 24 and 28.

Figure 3:
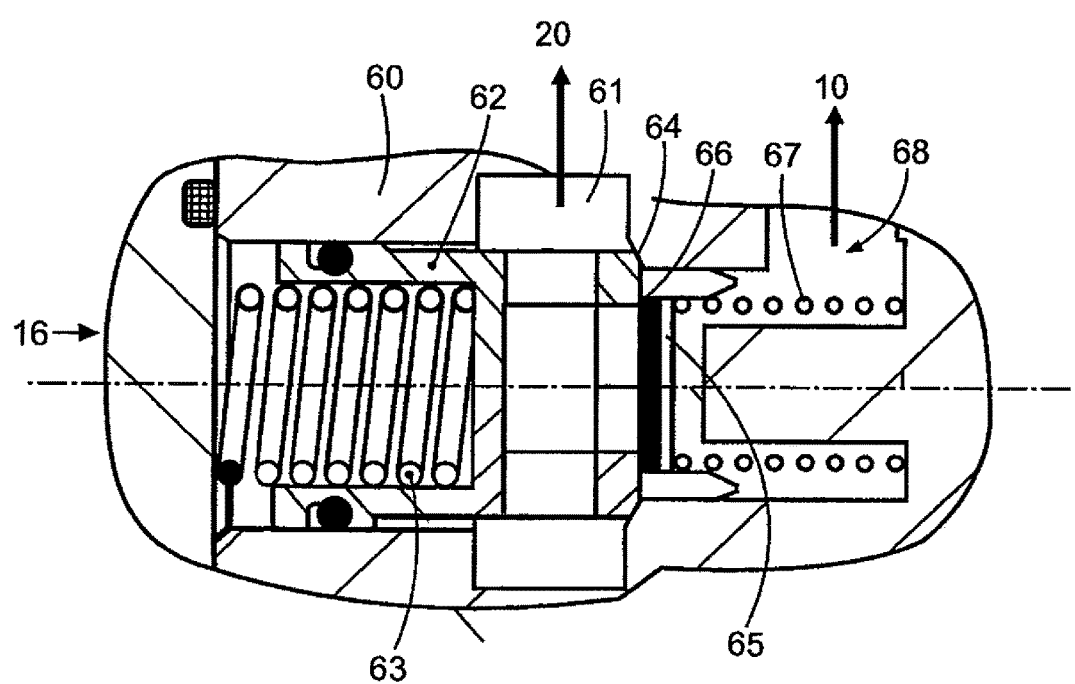
FIG. 3 shows a priority valve with a feedback device that can be used in a supply system for an air suspension system according to an embodiment of the invention.

FIG. 3 shows an exemplary embodiment of the priority valve 16 in the form of an overflow valve with feedback device 17. The overflow valve 16 has a valve housing 60 that comprises a fluid connection 61, which can be connected to the distributor line 18, and a valve body 62 that is biased onto a valve seat 64 by a spring 63. The overflow valve 16 also contains a fluid connection 68 which can be connected to the pressure line 14 and to the valve 10, and a valve element 65 which is biased by a spring 67 onto a valve seat 66 located on the valve body 62, the valve element 65 acting as a nonreturn valve.

If the fluid pressure at the connection 68 and the spring force of the spring 67 overcome the force applied by the spring 63, the valve body 62 lifts off from the valve seat 64, with the result that the connections 61, 68 are fluidically connected to one another. If, on the other hand, the fluid pressure at the connection 61 overcomes the force applied by the spring 67, the valve element 65 lifts off from the valve seat 66, with the result that the connections 61, 68 are fluidically coupled to one another and feedback is made possible.

The air suspension system can be embodied as a high pressure circuit since the air suspension system and the air spring bellows generally have large volumes and relatively high pressures.

The embodiments described above can also be used with other consumers and consumer circuits such as, for example, for controlling doors, driver's cabs, etc.

As described above, according to one or more embodiments, the compressed air supply system has, for a first compressed air consumer circuit, in particular, for an air suspension system for a vehicle such as, for example, a utility vehicle, a first compressed air line leading to the first compressed air consumer circuit and a distributor line leading to further consumer circuits. A priority valve arrangement is arranged between the first compressed air line leading to the compressed air consumer circuit and the distributor line leading to the further consumer circuits, wherein the first compressed air line does not have a protection valve. As a result, compressed air processes such as, for example, lifting or raising activities, can be carried out very quickly with priority.

A first nonreturn valve can be arranged between the outlet of an air dryer 4, on the one hand, and the first compressed air line and an inlet of the priority valve arrangement, on the other, in order to avoid pressure losses, wherein the first compressed air line can lead to at least one control valve of the first compressed air consumer circuit.

The priority valve arrangement can be embodied as an overflow valve, preferably with feedback, and there is therefore no need for an electrical controller.

The priority valve arrangement preferably does not have a hysteresis or only has a small or a negative hysteresis, and can advantageously have an opening pressure that is relatively high compared to the working pressure of the first compressed air consumer circuit.

In one advantageous embodiment, at least one first air container that is associated with the first compressed air consumer circuit can be connected to the distributor line via a second compressed air line, wherein the second compressed air line can contain a protection valve. The protection valve can be embodied as a solenoid valve or preferably as an overflow valve having a feedbackdevice connected to at least one air container of a compressed air consumer circuit. Similar to the priority valve, the protection valve can have no hysteresis or only a small hysteresis or a negative hysteresis.

In one advantageous embodiment, a connecting line can be provided between the first pressure line and the second pressure line leading to the first air container, with the result that a direct fluidic coupling can be achieved. In this connecting line, a valve, for example a solenoid valve or a nonreturn valve that does not require any electrical controller, can be arranged with the result that undesired feedbacks are prevented.

In addition, a nonreturn valve 50 may be present between the inlet of the priority valve arrangement 16 and at least one control valve 70 belonging to the first compressed air consumer circuit, for the purpose of defining the permissible direction flow. Likewise, a nonreturn valve 54 can be arranged between the protection valve 20 and the second pressure line 19, 72 leading to the at least one first air container 73 belonging to the first compressed air consumer circuit.

In one advantageous embodiment, the priority valve arrangement 16 can be embodied as an overflow valve that has a fluid connection, which can be connected to distributor line, and which can be closed by a valve body, a fluid connection that can be connected to the first compressed air line, and a valve element that acts as a nonreturn valve. The valve body can at the same time also form the valve seat for the valve element.

The scope of the invention also generally includes an air conditioning system, in particular for vehicles, that has a compressed air supply system, and an air suspension system, according to the description above.

In one embodiment, a method for controlling a compressed air supply system for a first compressed air consumer circuit, in particular for an air suspension system is made available, in which firstly the first compressed air consumer circuit is fed, and an air container, belonging to the first compressed air consumer circuit, of the compressed air consumer circuit is not filled via a priority valve arrangement until after a predetermined time period has passed or a predefined pressure has been attained in the compressed air consumer circuit.

For a rapid start of the vehicle, according to one or more embodiments, a partial filling of brake containers first takes place. Afterwards, the first compressed air consumer circuit and then the brake containers are filled further up to the opening pressure of a protection valve, which is embodied as an overflow valve, and subsequently the air container, belonging to the first compressed air consumer circuit, and further air containers are filled up to the switch off pressure.

According to one or more exemplary embodiments, in the compressed air supply system, in particular for an air suspension system for a vehicle, a priority valve arrangement is therefore arranged between a first compressed air line leading to a compressed air consumer system and a second compressed air line leading to a protection valve or air container, as well as a distributor line. The compressed air consumer system can be filled with priority and quickly become operationally capable.

It will be seen that the objects set forth above, among those made apparent from the preceding description, are efficiently attained, and since certain changes may be made without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A compressed air supply system for a vehicle suspension bellows and a plurality of consumer circuits, the compressed air supply system comprising:
a dryer component including an air dryer and a non-return valve, the dryer component providing a supply of compressed air through the non-return valve;
a compressed air line in fluid communication with the dryer component and having a control valve to deliver the supply of compressed air into the interior of the bellows;
a priority valve in fluid communication with the dryer component and the compressed air line, the priority valve having an opening pressure, the priority valve being connected in parallel with a feedback valve; and
a distributor line in fluid communication with the priority valve and coupled to the plurality of consumer circuits,
wherein the priority valve is operable to open the supply of compressed air to the distributor line when the pressure of the supply of compressed air is greater than the opening pressure of the priority valve such that the compressed air line is simultaneously coupled to each of the plurality of consumer circuits through the priority valve, wherein the priority valve is operable to close the supply of compressed air to the distributor line when the pressure of the supply of compressed air is less than the opening pressure of the priority valve, such that the bellows receives the supply of compressed air from the dryer component prior to the supply of compressed air being available to the plurality of consumer circuits, and wherein the feedback valve is operable to couple the distributor line to the compressed air line for filling of the bellows if the pressure in the distributor line is greater than the pressure in the compressed air line.

2. The compressed air supply system as claimed in claim 1, wherein the priority valve comprises an overflow valve.

3. The compressed air supply system as claimed in claim 1, wherein the priority valve is configured such that it lacks a hysteresis, has a small hysteresis, or has a negative hysteresis.

4. The compressed air supply system as claimed in claim 1, wherein the priority valve has a relatively high opening pressure compared to a working pressure of the compressed air line.

5. The compressed air supply system as claimed in claim 1, further comprising at least one first air container connected to the distributor line via a second compressed air line.

6. The compressed air supply system as claimed in claim 5, further comprising a protection valve in the second compressed air line.

7. The compressed air supply system as claimed in claim 6, wherein the protection valve comprises an overflow valve.

8. The compressed air supply system as claimed in claim 7, wherein the overflow valve comprises a feedback device.

9. The compressed air supply system as claimed in claim 7, wherein the overflow valve is configured such that it lacks a hysteresis, has a small hysteresis, or has a negative hysteresis.

10. The compressed air supply system as claimed in claim 1, further comprising a nonreturn valve between an inlet of the priority valve and the control valve of the compressed air line.

11. The compressed air supply system as claimed in claim 1, further comprising a nonreturn valve disposed between a protection valve and a second compressed air line that leads to at least a first air container.

12. The compressed air system as claimed in claim 1, wherein the combination of the priority valve and the feedback valve comprises an overflow valve having a first fluid connection connectable to the distributor line and closable by a valve body, a second fluid connection connectable to the compressed air line, and a valve element that functions as a nonreturn valve.

13. The compressed air supply system as claimed in claim 12, wherein the valve body forms a valve seat for the valve element.

14. An air conditioning system for a vehicle, comprising the compressed air supply system as claimed in claim 1.

* * * * *